United States Patent [19]
Nagahama et al.

[11] Patent Number: 5,272,329
[45] Date of Patent: Dec. 21, 1993

[54] OPTICAL PICKUP DEVICE USING A HOLOGRAPHIC OPTICAL ELEMENT AND AN AMPLIFIER

[75] Inventors: Toshiya Nagahama, Nara; Shigehiro Yamada, Yamatokoriyama; Naruichi Yokogawa, Kitakatsuragi; Yasushi Seike; Koji Yoshifusa, both of Higashihiroshima, all of Japan

[73] Assignee: Sharp Kabushiki Kaisha, Osaka, Japan

[21] Appl. No.: 762,420

[22] Filed: Sep. 19, 1991

[30] Foreign Application Priority Data

Sep. 27, 1990 [JP] Japan .................. 2-262100

[51] Int. Cl.⁵ .................................... H01J 3/14
[52] U.S. Cl. .................... 250/216; 369/44.12
[58] Field of Search ............... 250/201.5, 216, 202; 369/44.14, 44.23, 44.37, 44.12

[56] References Cited

U.S. PATENT DOCUMENTS

| | | | |
|---|---|---|---|
| 4,125,860 | 11/1978 | Ishii et al. | 369/44.14 |
| 4,486,870 | 12/1984 | Pettigrew et al. | 369/44.14 |
| 4,833,561 | 5/1989 | Sunagawa et al. | 369/44.12 |
| 4,835,378 | 5/1989 | Coops | 250/201.5 |
| 4,868,803 | 9/1989 | Sunagawa et al. | 369/44.23 |
| 4,885,732 | 12/1989 | Sunagawa et al. | 369/44.12 |
| 4,924,079 | 5/1990 | Opheij et al. | 250/201.5 |
| 4,929,823 | 5/1990 | Kato et al. | 369/44.23 |
| 5,018,804 | 5/1991 | Jung et al. | 250/201.5 |
| 5,049,732 | 9/1971 | Nagahama et al. | 250/44.37 |

FOREIGN PATENT DOCUMENTS

0320276 6/1989 European Pat. Off. .
3928931 3/1990 Fed. Rep. of Germany .
1-151022 6/1989 Japan .

OTHER PUBLICATIONS

Patent Abstracts of Japan, vol. 11, No. 208, Jul. 7, 1987.

*Primary Examiner*—David C. Nelms
*Assistant Examiner*—S. B. Allen

[57] ABSTRACT

An optical pickup using a holographic optical element includes a light source, a lens system for converting an optical beam outputted from the light source onto a recording carrier, a photodetector for detecting reflected light from the recording carrier and a diffraction grating for introducing the reflected light from the recording carrier to the photodetector in a light path connecting the recording carrier and the light receiving element. The photodetector includes a photodiode and a signal processing circuit which at least amplifies the output signal of the photodiode.

13 Claims, 6 Drawing Sheets

OPTICAL PICKUP DEVICE USING A HOLOGRAPHIC OPTICAL ELEMENT AND AN AMPLIFIER

BACKGROUND OF THE INVENTION

1. Field of the Invention

The present invention relates to an optical pickup used in an apparatus which records and reproduces utilizing an optical memory such as a compact disc player or a video disc player, and, more particularly, to an optical pickup using holographic optical element in an optical system in order to reduce size and weight.

2. Description of the Prior Art

FIG. 8 is a view showing a structure of a conventional optical pickup using a diffraction grating. In FIG. 8, light outputted from a semiconductor laser (laser diode) 34 is inputted to a first diffraction grating (referred to as a grating hereinafter) 35 and then separated to zero-order diffracted light (referred to as a main beam hereinafter) for reading an information signal and a pair of ±1-order diffracted light (referred to as a sub-beam hereinafter) for tracking which separates in a direction almost vertical to a paper surface. These three beams pass through a second diffraction grating (referred to as a hologram hereinafter) 36, a collimator lens 37 and an objective lens 38 and then converge at a recording carrier (disc) 39. Then, the reflected light from the recording carrier 39 passes through the objective lens 38 and the collimator lens 37 and then diffracted by the hologram 36 with the primary diffracted light being introduced to a photodetector 31.

FIGS. 9 and 10 show a grating pattern of the hologram 36 viewed from the recording carrier 39 and a pattern at a light receiving part of the photodetector 31, respectively. The hologram 36 comprises two regions 36a and 36b and the receiving part of the receiving element 31 comprises five regions 31a to 31e. The main beam diffracted in the region 36a of the hologram converges on a line between the light receiving parts 31a and 31b and the main beam diffracted in the region 36b converges in the light receiving part 31c. Then, two sub-beams converge in the light receiving parts 31d and 31e, respectively. Thus received light is converted to a current signal corresponding to a light intensity by the photodetector 31.

A current corresponding to each quantity of received light is generated from the light receiving parts 31a to 31e in the photodetector 31. The current is introduced into a current-voltage converting circuit positioned outside the optical pickup and converted to a voltage signal. Thereafter, a focus error signal (FES), a radial error signal (RES) and an information signal (RF) are generated by a signal operation circuit connected to the output of the current-voltage converting circuit. At this time, when signals outputted from the light receiving part 31a, 31b, 31c, 31d and 31e are designated by $S_{31a}$, $S_{31b}$, $S_{31c}$, $S_{31d}$ and $S_{31e}$, $FES = S_{31a} - S_{31b}$, $RES = S_{31d} - S_{31e}$ and $RF = S_{31a} + S_{31b} + S_{31c}$.

A structure of such optical pickup using holographic optical element is disclosed in "Optical Pickup" in Japanese Patent Laid Open No. 151022/1989.

However, optical utilization factor of the above optical pickup is lower, while the above optical pickup is smaller and its weight is less as compared with an optical pickup using a beam splitter of a half mirror instead of a diffraction grating. More specifically, when the half mirror is used, a quantity of light inputted to the photodetector becomes 25% when the light passes through the half mirror both ways. However, according to the pickup using the diffraction grating, a quantity of light is 14% at most when the light passes through the diffraction grating both ways. Thus, when the quantity of light becomes about half, an S/N ratio is deteriorated. The S/N ratio is likely to be deteriorated in process of transmitting a signal from the photodetector 31 to the current-voltage converting circuit by a small current.

In addition, when the signal processing circuit used together with the optical pickup is integrated corresponding to a signal level of the half mirror type optical pickup, the optical pickup using the holographic optical element whose signal level is about ½ can not be connected. Therefore, when the optical pickup using the holographic optical element is used together with the signal processing circuit, an amplifying circuit for adjusting a gain has to be provided between the optical pickup and the signal processing circuit.

SUMMARY OF THE INVENTION

The present invention was made in order to solve above problems and it is a general object of the present invention to provide an optical pickup using a hologram optical element in which an S/N ratio of an output signal from a photodetector can be improved.

According to the present invention, an optical pickup using holographic optical element comprising a light source, a lens system for converting an optical beam outputted from the light source onto a recording carrier, a photodetector for detecting reflected light from the recording carrier and a diffraction grating for introducing the reflected light from the recording carrier to the photodetector in a light path connecting the recording carrier and the photodetector, the photodetector comprising a photodiode and a signal processing circuit which at least amplifies output signal of the photodiode.

According to the present invention, the photodiode of the photodetector detects reflected light introduced from the recording carrier by the diffraction grating and outputs a signal. This output signal is inputted to the signal processing circuit. The signal processing circuit at least amplifies the output signal and then outputs it to the outside. Thus, weakening of the output signal which is caused by a lack of light generated by the diffraction grating and inputted to the photodiode is prevented. Therefore, the S/N ratio is improved.

As described above, even if the diffraction grating whose light utilization factor is small is used, it is possible to obtain an output signal having a good S/N ratio and also possible to reduce the number of parts.

DESCRIPTION OF THE DRAWINGS

An embodiment of the invention will now be described by way of example and with reference to the accompanying drawings, in which.

DESCRIPTION OF THE PREFERRED EMBODIMENTS

Figure 8:
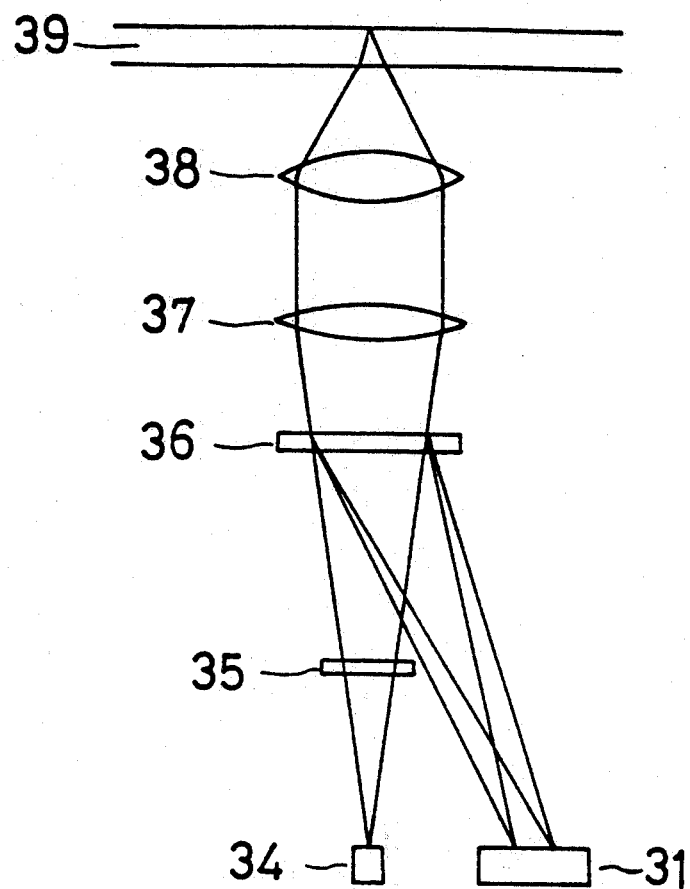
FIG. 8 is a schematic view showing a whole structure of an optical pickup.
Figure 9:
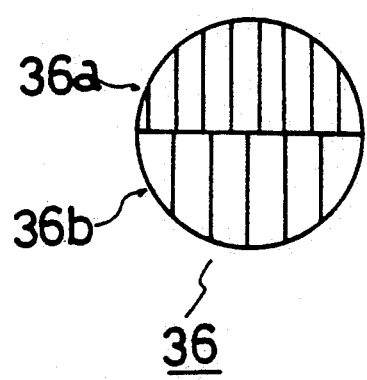
FIG. 9 is a plan view showing a grating pattern of a hologram of the optical pickup.
Figure 10:
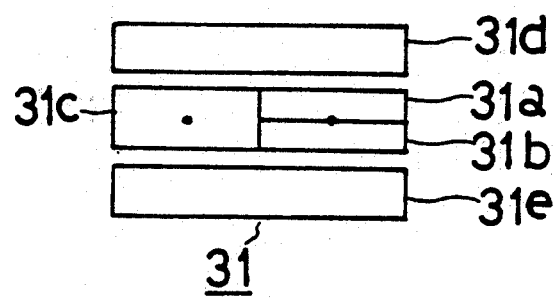
FIG. 10 is a plan view showing a pattern at a light receiving part of a conventional photodetector.

The whole structure except for a structure of a photodetector of an optical pickup in accordance with an embodiment of the present invention is the same as that shown in FIG. 8, so that its description is omitted.

Figure 2:
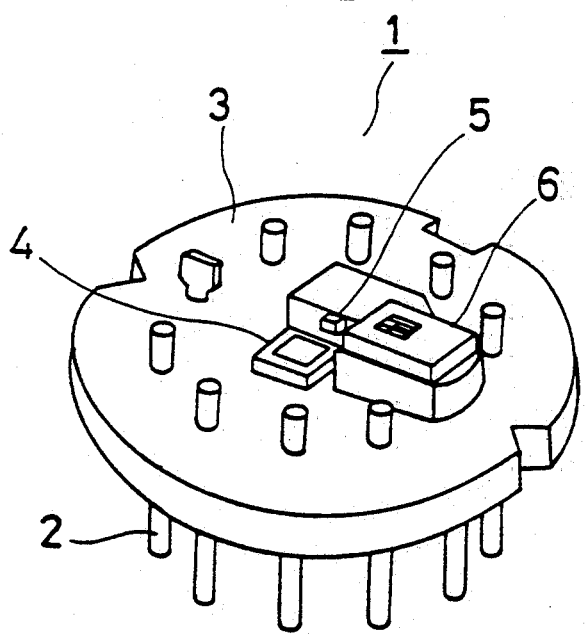
FIGS. 2 and 3 are a perspective view and a partially omitted longitudinal sectional view, respectively, each showing a structure of a laser unit of the embodiment of the present invention.
Figure 3:
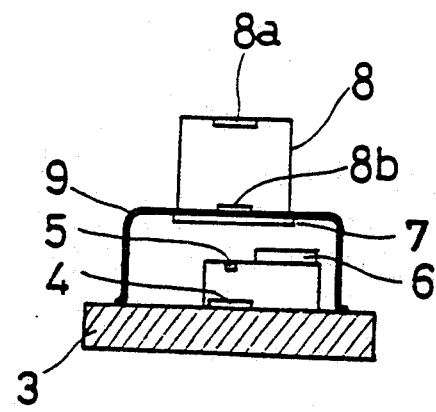

FIG. 2 is a perspective view showing an inside structure of a laser unit in accordance with the embodiment of the present invention and FIG. 3 is a longitudinal sectional view showing the laser unit.

In the laser unit 1, a monitor photodiode 4, a laser diode 5 serving as a light source and a light receiving element 6 are arranged on a stem 3 having lead pins 2 for connection to the outside. In addition, a cap 9 having a cap glass 7 and a hologram glass 8 at the upper side so as to protect these elements is provided on the stem 3. The hologram glass 8 comprises a hologram pattern 8a and a grating pattern 8b.

Figure 1:
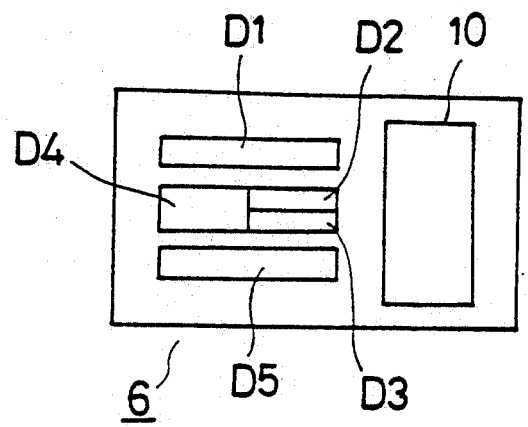
FIG. 1 is a plan view showing a structure of a photodetector in accordance with an embodiment of the present invention.

As shown in FIG. 1, the photodetector 6 comprises five photodiodes D1, D2, D3, D4 and D5 and a signal processing circuit 10 which amplifies at least output signals from the photodiodes D1 to D5.

Figure 4:
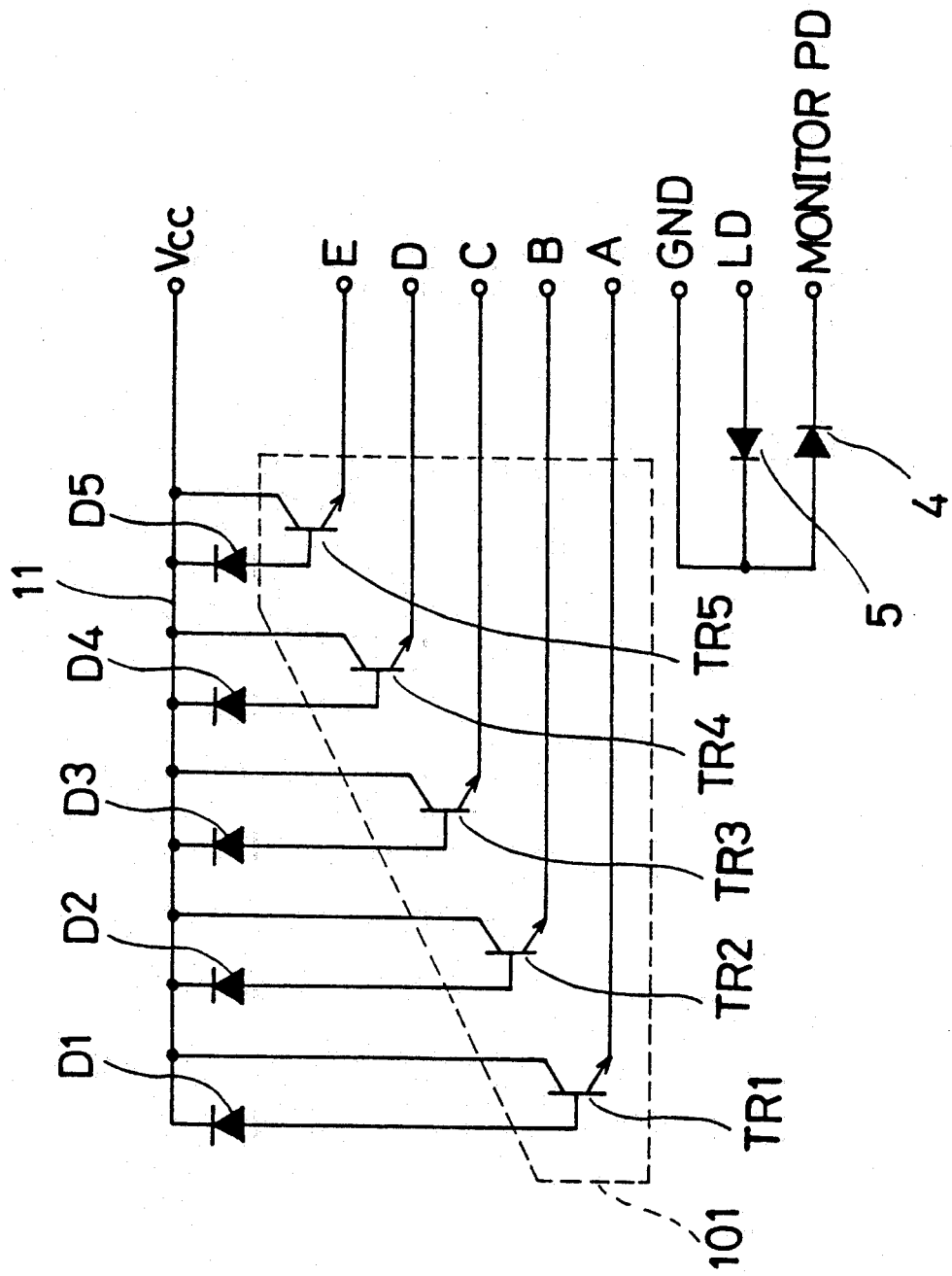
FIG. 4 is a circuit diagram showing a structure of a signal processing circuit in accordance with a first embodiment of the present invention.

FIG. 4 is a view showing a first structure of the signal processing circuit 10. In FIG. 4, a signal processing circuit 101 comprises transistors TR1, TR2, TR3, TR4 and TR5 which are provided corresponding to the photodiodes D1, D2, D3, D4 and D5, respectively. More specifically, a base of each of the transistors TR1 to TR5 is connected to an anode of each of the photodiodes D1 to D5 and each collector is connected to a cathode of each of the photodiodes D1 to D5 and to a power supply line 11 connected to an outside power supply. An emitter of each of the transistors TR1 to TR5 is connected to the pin 2 and becomes an output end of the photodetector 6.

The signal processing circuit 101 is a current amplifying circuit which amplifies a current output corresponding to a quantity of light received by the photodiodes D1 to D5 and outputs it. Therefore, because the level of the output current of the photodetector 6 is larger than that of the conventional one, influence of disturbance is comparatively small and degradation of the S/N ratio is reduced. The level of the output current may be adjusted by adjusting the amplification degree of the transistors TR1 to TR5 in accordance with the input level of an I-V converting circuit of a latter stage or the signal processing circuit.

Figure 5:
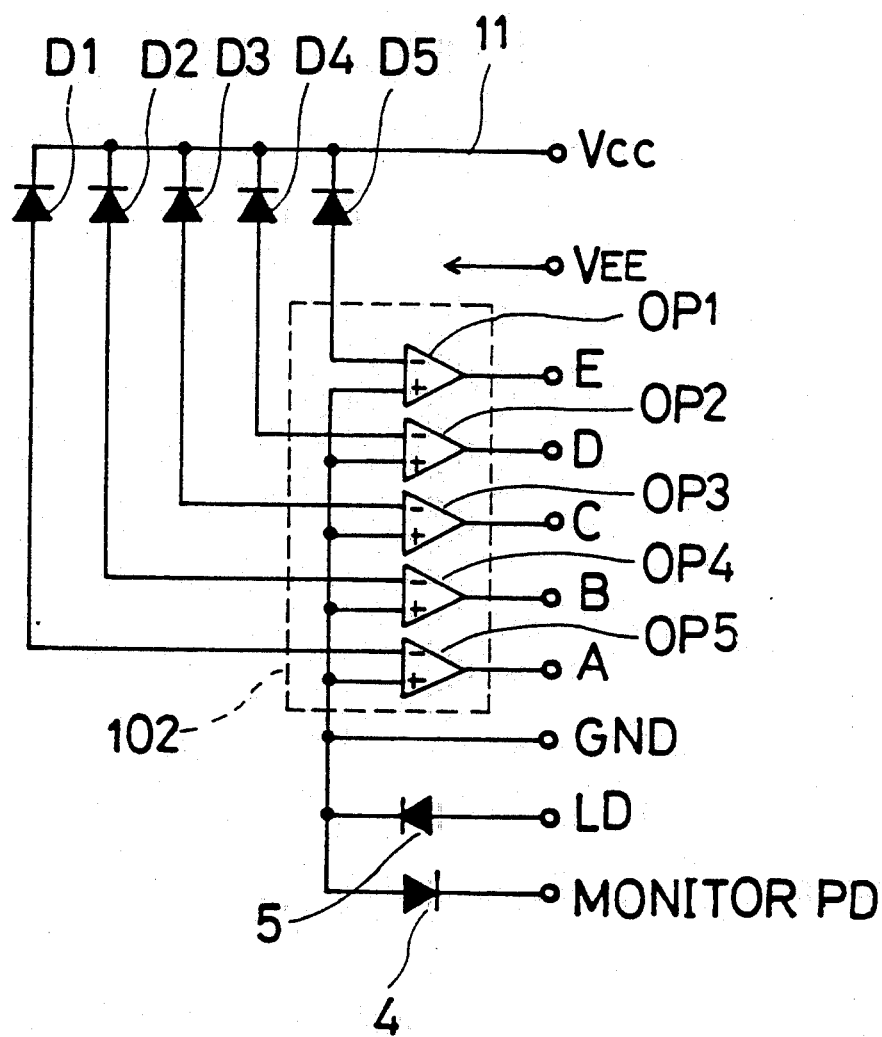
FIG. 5 is a circuit diagram showing a structure of a signal processing circuit in accordance with a second embodiment of the present invention.

FIG. 5 is a view showing a second structure of the signal processing circuit 10. In FIG. 5, a signal processing circuit 102 is an I-V (current-voltage) converting circuit comprising operational amplifiers OP1, OP2, OP3, OP4 and OP5. An (−) input of each of the operational amplifiers OP1 to OP5 is connected to an anode of each of the photodiodes D1 to D5 and (+) input is connected to a ground GND.

A current generated in each of the photodiodes D1 to D5 is converted to a voltage by each of the operational amplifiers OP1 to OP5 and then outputted. In this case, connection to the outside signal operating circuit can be easily implemented by setting the amplification degree of each of the operational amplifiers OP1 to OP5 in accordance with sensitivity of each of the photodiodes D1 to D5.

Figure 6:
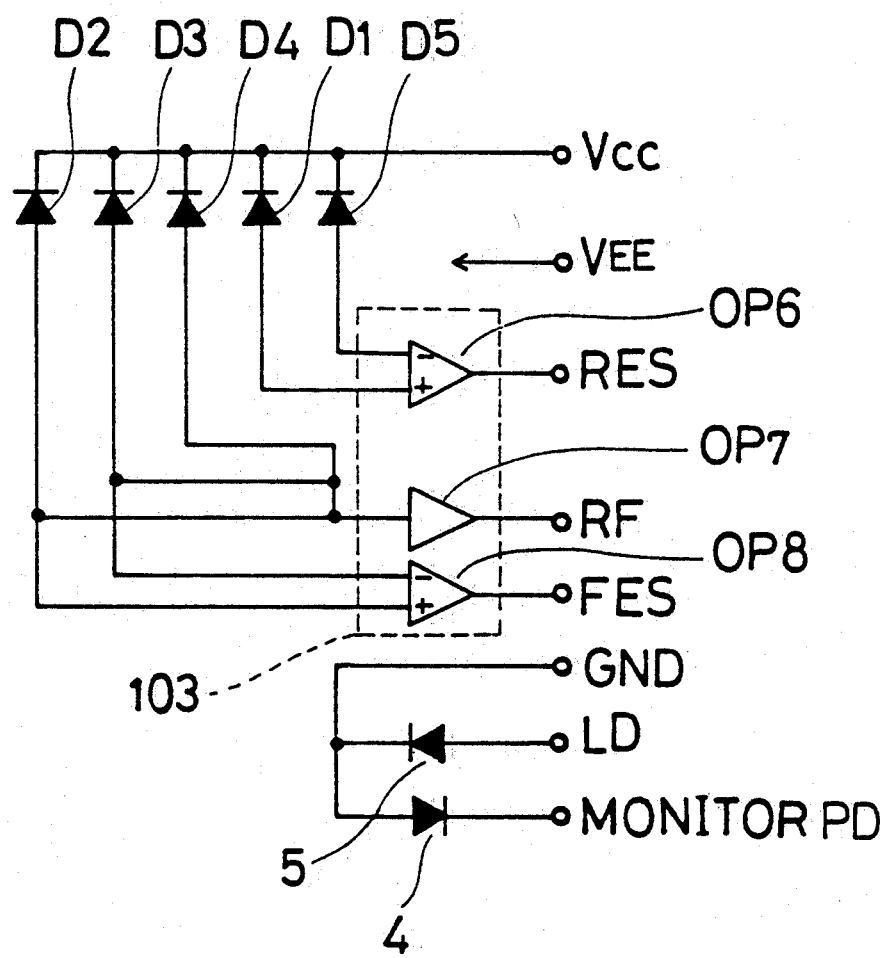
FIG. 6 is a circuit diagram showing a structure of a signal processing circuit in accordance with a third embodiment of the present invention.

FIG. 6 is a view showing a third structure of the signal processing circuit. In FIG. 6, a signal processing circuit 103 is an I-V converting and signal operation circuit comprising three operational amplifiers OP6, OP7 and OP8. More specifically, the operational amplifier OP6 performs operation in which the output current of the photodiode D1 is subtracted from the output current of the photodiode D5 to output the radial error signal RES. The operational amplifier OP7 performs addition by adding the output current of the photodiodes D2, D3 and D4 and then outputs the information signal RF. In addition, the operational amplifier OP8 performs subtraction by subtracting the output current of the photodiode D2 from the output current of the photodiode D3 and then outputs the focus error signal FES.

In this third structure, the respective signals outputted from the signal processing circuit 103 are voltage signals. More specifically, in each of the operational amplifiers OP6, OP7 and OP8, current-voltage conversion, amplification and each operation are performed. Therefore, the output signal is not likely to be influenced by disturbance and deterioration of the S/N ratio is reduced. In addition, the signal is outputted in the form of the focus and radial error signals and information signal, so that the outer circuit capable of being connected in this embodiment may be a common circuit which can process these signals. Thus, for example, it is not necessary to consider a difference of operation process of generation of the focus error signal when the outer circuit is determined.

Figure 7:
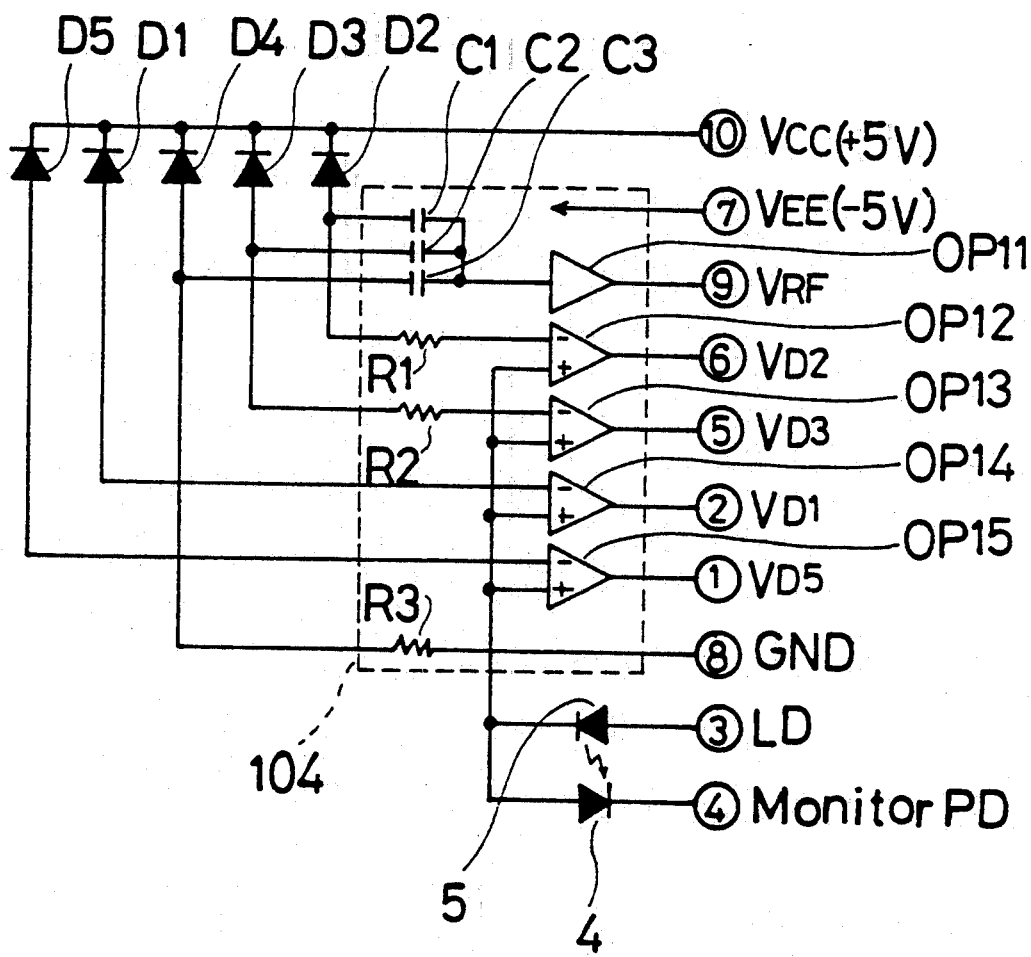
FIG. 7 is a circuit diagram showing a structure of a signal processing circuit in accordance with a fourth embodiment of the present invention.

FIG. 7 is a view showing a fourth structure of the signal processing circuit 10.

In FIG. 7, a signal processing circuit 104 comprises five operational amplifiers OP11 to OP15, resistors R1 to R3 and capacitors C1 to C3. The operational amplifier OP11 converts the output current of the photodiodes D2, D3 and D4 to a voltage and also adds and outputs them. The capacitors C1 to C3 are for DC blocking. The operational amplifiers OP12 and OP13 operate as I-V converting circuits. More specifically, it amplifies the current signals outputted from the photodiodes D1, D2, D3 and D5 and also converts them to a voltage and then outputs them.

In the fourth structure, the output signal of the photodiode D4 is not outputted alone. More specifically, the signal processing circuit 104 outputs the information signal RF ($V_{RF}$), so that the radial and focus error signals necessary for servo control can be operated by the output signals of the photodiodes D1, D2, D3 and D5. Thus, in this structure, various signal operating circuits can be connected.

In addition, the photodetector in the above embodiments of the present invention is manufactured by forming the photodiode and the signal processing circuit on the same semiconductor substrate. In the manufacturing process, well-known technique of manufacturing an integrated circuit is used.

While only certain presently preferred embodiments have been described in detail, as will be apparent with those skilled in the art, certain changes and modifications can be made without departing from the scope of the invention as defined by the following claims.

What is claimed is:

1. An optical pickup device using a holographic optical element comprising:
   a light source;
   a lens system for directing an optical beam from said light source onto a recording carrier;
   a photodetector for detecting light reflected from the recording carrier; and
   a diffraction grating for directing the reflected light from the recording carrier to a light receiving element of said photodetector, said diffraction grating being positioned in a light path between the recording carrier and said photodetector;
   said diffraction grating being a holographic optical element;
   said photodetector including a plurality of photodiode and a plurality of amplifiers, each amplifier being connected to only a single photodiode so as to amplify an output signal from only said single photodiode.

2. The optical pickup device as set forth in claim 1, wherein said amplifiers shares a power supply with said photodiodes, said amplifiers being a plurality of transistors, each transistor being connected only to a corresponding single photodiode, and each amplifier amplifying the output signal of only said single photodiode to generate an output signal of said photodetector.

3. The optical pickup device as set forth in claim 1, wherein said amplifiers are a plurality of operational amplifiers, each operational amplifier being connected only to a corresponding single photodiode to convert an output signal of said single photodiode to a voltage and to output the voltage as an output signal of said photodetector.

4. The optical pickup device as set forth in claim 1, wherein each amplifier is an operational amplifier for operating upon an output current of only said single photodiode, for converting the operational result to a voltage and for outputting the voltage as an output signal of said photodetector.

5. The optical pickup device as set forth in claim 1, wherein each amplifier is an operational amplifier which converts an output current of only said single photodiode to a voltage and adds the voltage after conversion.

6. The optical pickup device as set forth in claim 1, wherein said single photodiode and corresponding amplifier are formed on a same semiconductor substrate.

7. An optical pickup device using a holographic optical element comprising:
   laser means for providing a light;
   lens means for directing an optical beam from said light source onto a recording carrier;
   photodetector means for detecting light reflected from the recording carrier; and
   diffraction grating means for directing the reflected light from the recording carrier to a light receiving element of said photodetector means, said diffraction grating means being positioned in a light path between the recording carrier and said photodetector means;
   said diffraction grating means being a holographic optical element;
   said photodetector means including a photodiode and amplifier means for amplifying an output signal from only a single photodiode.

8. The optical pickup device as set forth in claim 7, wherein said amplifier means shares a power supply with said photodiode;
   said photodetector means including a plurality of photodiodes;
   said amplifier means having a plurality of transistors, each transistor being connected to only a corresponding single photodiode to amplify the output signal of only said single photodiode and to generate an output signal of said photodetector means.

9. The optical pickup device as set forth in claim 7, wherein said amplifier means has a plurality of operational amplifiers;
   said photodetector means including a plurality of photodiodes;
   each operational amplifier being connected to only a corresponding single photodiode and to convert an output signal of said single photodiode to a voltage and to output the voltage as an output signal of said photodetector means.

10. The optical pickup device as set forth in claim 7, wherein said amplifier means has a plurality of operational amplifiers;
    said photodetector means including a plurality of photodiodes;
    each operational amplifier operating upon an output current of only said single photodiode, for converting the operational result to a voltage and for outputting the voltage as an output signal of said photodetector means.

11. The optical pickup device as set forth in claim 7, wherein said amplifier means comprises:
    an operational amplifier which converts an output current of only said single photodiode to a voltage and adds the voltage after conversion.

12. The optical pickup device as set forth in claim 7, wherein said photodiode and said amplifier means are formed on a same semiconductor substrate.

13. An optical pickup method using a holographic optical element comprising the steps of:
    (a) providing a light;
    (b) directing an optical beam from the light provided by said step (a) onto a recording carrier;
    (c) detecting light reflected from the recording carrier;
    (d) directing the reflected light from the recording carrier to a light receiving element of a photodetector by using a diffraction grating, the diffraction grating being positioned in a light path between the recording carrier and the photodetector, the diffraction grating being a holographic optical element; and
    (e) amplifying an output signal from only a single photodetector by using a single amplifier connected only to a single photodiode.

* * * * *